Figure 1:
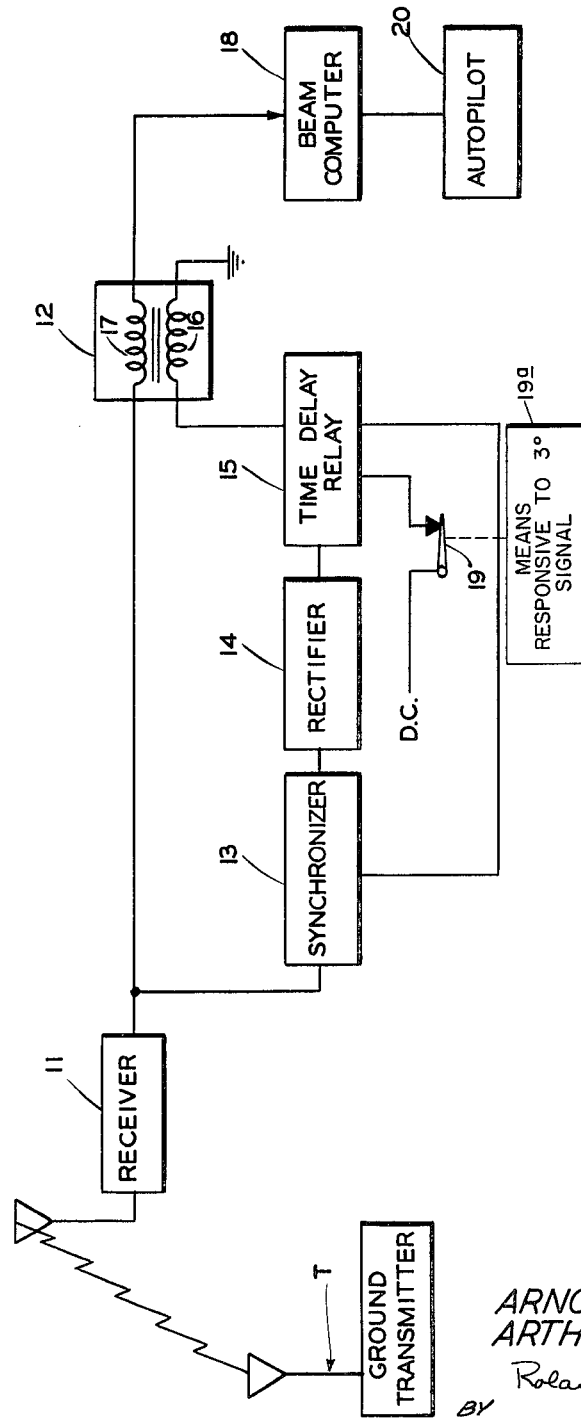

INVENTORS
ARNOLD UNGER
ARTHUR C. DIANI

BY Roland Plottel

ATTORNEY

INVENTORS
*ARNOLD UNGER
ARTHUR C. DIANI*
BY Roland Plottel
ATTORNEY

United States Patent Office 3,241,143
Patented Mar. 15, 1966

3,241,143
OPTIMUM BEAM CAPTIVE CONTROL DEVICE FOR PROVIDING DISTANCE INFORMATION
Arnold Unger, Totowa, and Arthur C. Diani, Clifton, N.J., assignors to The Bendix Corporation, Teterboro, N.J., a corporation of Delaware
Filed Mar. 8, 1963, Ser. No. 263,935
20 Claims. (Cl. 343—107)

This invention relates to an aircraft approach computer, and more particularly to an aircraft approach computer which provides distance information from Visual Omni Range (VOR) and/or Localizer (LOC) transmitting stations without use of Distance Measuring Equipment (DME).

At present, approach computers do not experience beam gain coestating (i.e. gain adjustment) on Visual Omni Range or Localizer as a function of transmitting station proximity as is done on Localizer-Glide Path (LOC-G.P.). Localizer-Glide Path coestating is accomplished either by use of a clutched altitude potentiometer, or a thermistor circuit energized at Glide Path engagement. This coestating is necessary to insure a stable approach, since beam geometry inherently causes an effective increase in beam gain as the transmitting station is neared. This is because lateral distance from beam center per degree of beam error decreases as the aircraft approaches the transmitting station.

On Visual Omni Range or Localizer this inherent effective increase in beam gain with transmitting station proximity prevents satisfactory beam capture at distances from the transmitting station less than approximately 20 miles on Visual Omni Range and approximately 8 miles on Localizer. Satisfactory beam capture which is limited by the turns ratio of the airplane should be asymptotic, that is, with low rise time and minimum overshoot. Furthermore, beam gain coestating after beam capture is desirable on Visual Omni Range and/or Localizer as a function of transmitting station proximity, as is done in the Glide Path mode. It is imperative that distance information from Visual Omni Range and/or Localizer transmitting stations be provided if satisfactory beam captures at various distances from the transmitting station and/or optimum tracking of the captured beam are to be accomplished.

Therefore, one object of this invention is to provide distance information from Visual Omni Range and/or Localizer transmitting station information without the use of Distance Measuring Equipment.

Another object of this invention is to achieve satisfactory beam capture independently of airspeed and/or intercept angle of the aircraft.

Another object of this invention is to coestate beam error gain to allow satisfactory beam capture at smaller distances from the transmitting station than heretofore possible.

The invention contemplates a beam capture control device for providing distance information to a computer, comprising switching means having a control circuit, means producing a beam error signal connected to the switching means, and means responsive to a predetermined degree of angular beam error and connected to the control circuit of the switching means for changing impedance of the switching means from a high to a low value after a predetermined interval of time, thereby changing beam error signal gain for application to the computer.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 2:
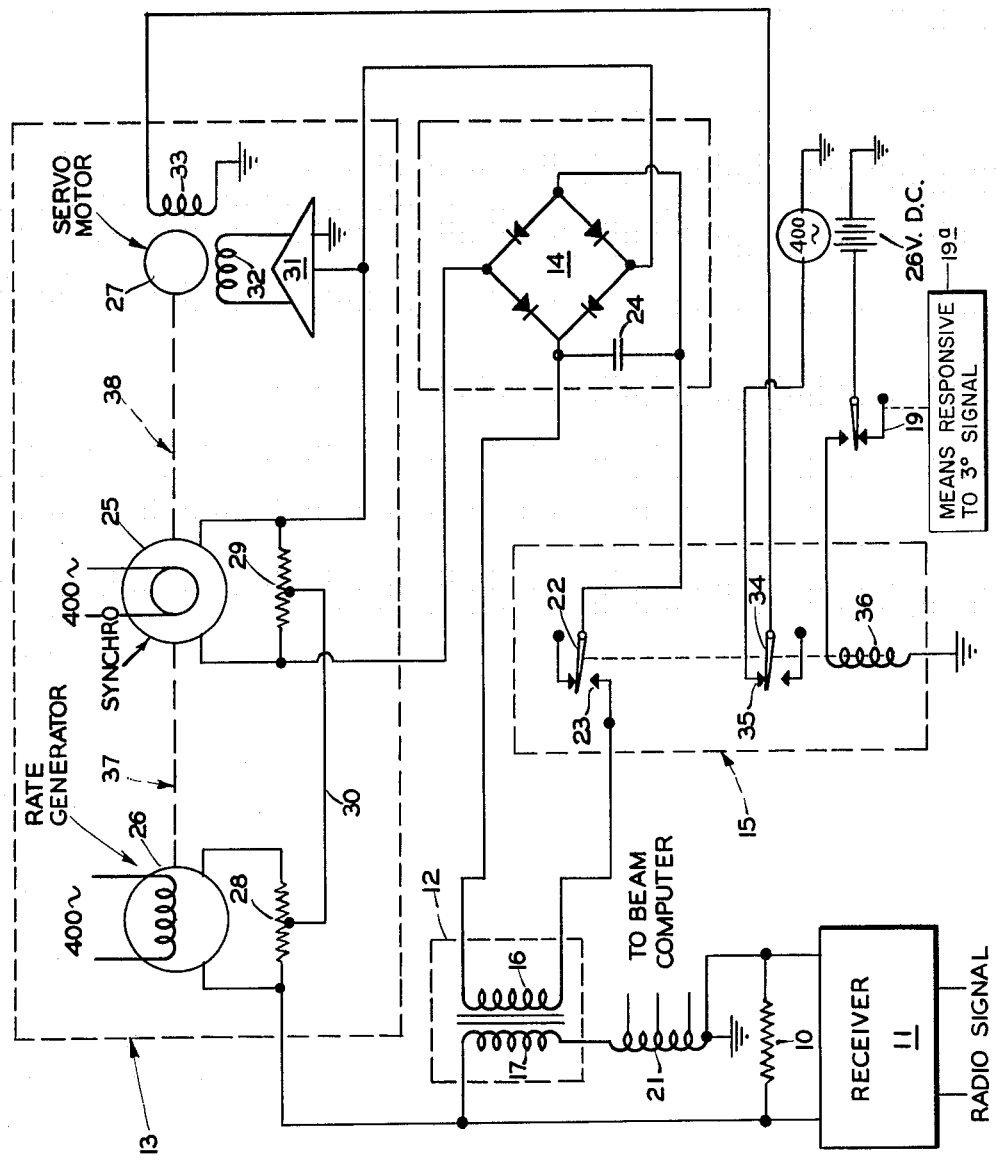
Figure 3:
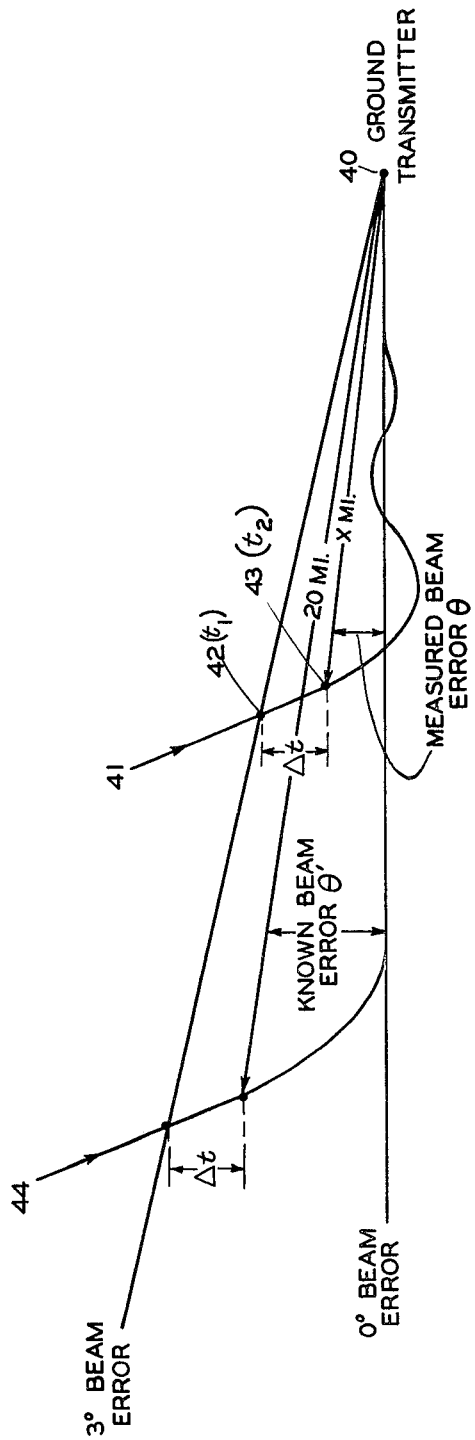

In the drawings:
FIGURE 1 is a block diagram showing the general organization of the beam capture control device.
FIGURE 2 is a schematic drawing showing a beam capture control device constructed according to the invention.
FIGURE 3 is a schematic drawing showing geometrical relationships of parameters necessary for obtaining distance information from a Visual Omni Range or Localizer signal.

Referring now to the drawings for a more detailed description of the novel optimum beam capture control device, the device as shown in FIGURE 1 includes a receiver 11 for receiving a signal from a transmitter T located on the ground. The output of the receiver 11 varies in a proportionate relationship to the strength of the received signal, and is applied through a variable impedance device such as a saturable reactor 12 to a beam computer 18. The output of receiver 11 also is applied to a synchronizer 13 which provides a signal proportional to the output of receiver 11 in steady state. The signal produced by synchronizer 13 is applied through a rectifier 14 and a time relay relay 15 to the control winding 16 of saturable reactor 12 to vary the impedance of load winding 17 of the saturable reactor in accordance with the strength of the signal from receiver 11 so that a portion of the output of receiver 11 is applied to the input of beam computer 18 for controlling the craft by means of an autopilot 20.

Operation of time delay relay 15 is controlled by a switch 19 which upon closing applies a D.C. potential to a heating element of the time delay relay. Switch 19, which may be an integrator cut-in contact, operates as a function of beam error and preferably operates at approximately 3 degrees of beam error on Visual Omni Range. The means 19a responsive to 3° signal for controlling switch 19 may be of the kind shown in Unger et al. U.S. Pat. No. 3,055,617 issued Sept. 25, 1962, and assigned to the same assignee as the present application. When the circuit shown in the above patent is used in the present application, the beam error signal is applied to terminals 101, 103 in FIGURE 3 and the constants of the circuit are chosen so that the relay operates in response to a three degree beam error signal. Time delay relay 15 closes after a time interval $\Delta t$ reckoned from the instant $t_1$ at which a beam error of approximately 3 degrees is experienced and at the instant $t_2$ a D.C. potential appears at the saturable reactor control winding 16. At time $t_2$, the time delay relay 15 opens a circuit in synchronizer 13 thus preventing the D.C. voltage applied to control winding 16 of the saturable reactor 12 from changing any further.

For nominal air speed (such as 300 m.p.h.) and intercept angle (such as 15 degrees) beam computer 18 will experience at time $t_2$ a lesser beam error at distances near the ground station than at distances further removed. Consequently, at time $t_2$ the synchronizer output as well as the D.C. voltage on control winding 16 will depend upon distance from the ground transmitting station. Thus, impedance of the load winding 17 of saturable reactor 12, and in turn beam error gain, are made a function of transmitting station proximity.

Referring now to FIGURE 2 for additional detail, receiver 11 is shown having a load resistor 10 connected across its output. The load winding 17 of saturable reactor 12 is connected in series with an auto-transformer 21 across the output of receiver 11 also. Impedance of load winding 17 is controlled by a D.C. voltage applied across the control winding 16 of reactor 12. This D.C. voltage appears at the instant an armature 22 of the time delay relay 15 makes electrical contact with terminal 23 of the relay 15. This D.C. voltage is applied from rectifier 14, shown in FIGURE 2 as a bridge-connected full wave rectifier having a capacitor 24 connected across its output for filtering purposes The rectifier 14 receives its input voltage from the synchronizer 13 which comprises a synchro 25 and a rate generator 26 mechanically coupled through gear trains 37 and 38 to a two phase motor 27. Synchro 25 and rate generator 26 are energized from an A.C. source. Output of rate generator 26 is applied across a resistance 28 with an adjustable tap and output of synchro 25 is applied across a resistor 29 with an adjustable tap. Output of the receiver 11 is added to the signals from resistors 28 and 29. The sum is then conducted by a conductor 30 to an amplifier 31 which controls one phase 32 of motor 27. A second phase 33 of motor 27 is energized from the A.C. source. Phase winding 33 is energized when an armature 34 makes contact with a terminal 35 in the time delay relay 15. Energization of the delay relay 15 occurs when a coil 36 of the relay receives a D.C. voltage such as 26 volts, which is conveniently available aboard aircraft. This energization is achieved when the switch 19 closes. It should be noted that there is a finite interval of time, $\Delta t$, between the time that switch 19 closes, and the time that armature 22 makes contact with terminal 23 and armature 34 breaks contact with terminal 35. This is due to inductance of the coil 36, which delays build-up of current in the coil when voltage is applied to the coil, as is known in the art. If the time at which switch 19 closes is referred to as $t_1$ and the time at which armature 22 contacts terminal 23 and armature 34 breaks contact with terminal 35 is referred to as $t_2$, then $$t_2 - t_1 = \Delta t$$

In operation assume that receiver 11 is receiving a signal from a ground Visual Omni Range or Localizer transmitting station. The receiver generates a beam error signal E, which varies in a relationship proportional to the strength of the received signal. The error signal also appears across the series connection of load winding 17 of saturable reactor 12 and auto transformer 21. A variety of voltages can be picked off of the auto transformer and applied to the autopilot through the beam computer. The beam error signal E is also conducted to amplifier 31 through resistances 28, 29. The signal thus applied to amplifier 31 causes the motor 27 to drive the rotor of synchro 25 through the gear train 38. This causes a variation in the output voltage of synchro 25, which appears across resistance 29. This voltage is then applied to rectifier 14 which full wave rectifies the voltage, so that a D.C. voltage, smoothed by capacitor 24, appears between armature 22 and terminal 23 of time delay relay 15. This voltage is an attenuated version of the signal E appearing across resistor 10, and has a value of KE in steady state, where K represents a constant attenuation factor.

When the beam error reaches a predetermined value (such as 3 degrees beam error on Visual Omni Range) switch 19 closes. This occurs at time $t_1$. After the finite time interval $\Delta t$, during which current in coil 36 builds up to the point required to actuate armatures 22 and 34, armature 22 makes contact with terminal 23 and armature 34 breaks contact with terminal 35. As previously explained, this actuation occurs at time $t_2$. At this instant the D.C. output voltage of rectifier 14 is applied across control winding 16 of saturable reactor 12. This causes a drop in impedance of load winding 17 so that the portion of error signal E appearing across auto transformer 21 increases. Thus an increased amplitude of signal, produced as a result of the gain change on the signal appearing across the auto transformer, is conducted to beam computer 18 and thence to the autopilot. At the same instant, $t_2$, armature 34 removes the A.C. voltage from the fixed phase 33 of motor 27.

Thus the motor can no longer drive synchro 25, resulting in a voltage across resistance 29 of value KE, which is now solely dependent upon distance from the ground transmitting station. Thus, saturable reactor load winding impedance and in turn beam error gain are made a function of transmitting station proximity.

Rotation of synchro 25 results in rotation of rate generator 26. This generates a voltage across resistance 28 having an amplitude proportional to the rate of rotation of the generator. A portion of this signal is fed back through resistor 29 to amplifier 31 so as to provide negative feedback and achieve rate stabilization for motor 27 in a manner well known in the art.

Upon a decrease in the beam error below a predetermined angular value, switch 19 disconnects coil 36 from the D.C. source. This serves to disconnect armature 22 from terminal 23, and to connect armature 34 to terminal 35. This results in again permitting rotation of motor 27 by energizing the fixed phase 33. At the instant of energization of fixed phase 33, impedance of load winding 17 increases, due to de-energization of control winding 16. This decreases the voltage across auto transformer 21, resulting in a decrease of voltage applied to beam computer 18 and the autopilot.

FIGURE 3 diagrammatically illustrates the computing process which the beam computer accomplishes. Assume a ground transmitter 40 is emanating a signal. The aircraft at a first distance from the ground transmitter flies a path indicated generally by the numeral 41. When the aircraft reaches location 42, beam error is at a predetermined degree. (Assume this error is chosen to be 3°.) At this point, the coil 36 of time delay relay 15, shown in FIGURE 2, is energized. At the end of a predetermined interval of time, the armatures 22 and 34 of time delay relay 15 are actuated. At this instant, gain of the beam error signal applied to the computer is increased, as previously explained, and the degree of beam error is measured at this instant.

By comparison of path 41 which has been flown by the aircraft with a substantially parallel path 44 at a second, known distance from the ground transmitter, distance between the aircraft and the ground transmitter can be determined. This is done in the following manner:

Assume that capture path 41 is flown at the same bearing as that of a known capture path 44 intersecting the beam at the predetermined angle of error and a predetermined distance from the transmitter. At the end of a predetermined time delay, $\Delta t$, the beam error signal is applied to the computer. The computer then compares beam error measured at the end of time $\Delta t$ (which may be referred to as $\theta°$), at an unknown distance $x$ from the transmitter, with beam error, which is known, at the end of time $\Delta t$ (which may be referred to as $\theta'°$) at the known distance (such as 20 miles) from the transmitter. This provides the computer with the simple trigonometric equation $$\frac{xMi}{20Mi} = \frac{\sin (3-\theta')°}{\sin (3-\theta)°}$$

whereby $$x = 20 \frac{\sin (3-\theta')°}{\sin (3-\theta)°} Mi$$

Thus the computer, by solving for $x$, provides information as to distance from the transmitter.

If at a given distance from the ground transmitting station the intercept angle of the aircraft is less than nominal, the beam error gain obtained from the auto transformer at time $t_2$ will be greater than that existing at nominal intercept angle. This effect is helpful in achieving the desired beam capture response. Conversely for an intercept angle larger than nominal, beam error gain at $t_2$ will be smaller, which is also desirable.

Air speed deviation from nominal likewise affects beam error gain at time $t_2$. This effect is such as to increase beam gain at $t_2$ at air speeds below nominal, and decrease it at air speed above nominal. This tendency is also instrumental in achieving optimum beam capture performance.

Having now a parameter which is a function of transmitting station proximity (without Distance Measuring Equipment), other features such as beam gain or displacement limit coestating on track can be accomplished (by use of a thermistor) in addition to optimization of beam captures. Furthermore, because of the beam gain coestating capability of this circuit, beam captures can now be made at lesser distances from the transmitting station without excessive overshoot.

This device provides means for presenting distance information from Visual Omni Range or Localizer transmitting station information without use of Distance Measuring Equipment. It provides a means for achieving satisfactory beam captures independent of the air speed and intercept angle of the aircraft. The device is lightweight, rugged, and reliable, with simplicity of connections for ease in servicing.

Although but one embodiment of the invention has been illustrated and described in detail, it is to be expressly understood that the invention is not limited. Various changes can be made in the design and arrangements of the parts without departing from the spirit and scope of the invention as the same will now be understood by those skilled in the art.

What is claimed is:

1. A beam capture control device for providing distance information to a computer, comprising a variable impedance device, means producing a beam error signal connected to the variable impedance device, and means responsive to a predetermined degree of angular beam error and connected to the variable impedance device for changing impedance of the device from a high to a low value after a predetermined interval of time, thereby changing beam error signal gain for application to the computer.

2. A beam capture control device for providing distance information to a computer, comprising a saturable reactor having a load winding and a control winding, means producing a beam error signal connected to the load winding of the saturable reactor, a time delay means, and means responsive to a predetermined degree of angular beam error and connected through the time delay means to the control winding of the saturable reactor for applying saturation voltage across the control winding after a predetermined interval of time whereby gain of the beam error signal for application to the computer is increased.

3. The beam capture control device of claim 2 having circuit means connected between the means producing the beam error signal and the control winding of the saturable reactor whereby the amplitude of D.C. voltage applied to the control winding is proportional to the amplitude of beam error signal.

4. A beam capture control device for providing distance information to a computer, comprising a saturable reactor having a load winding and a control winding, means producing a beam error signal connected to the load winding of the saturable reactor, a time delay relay having a coil and contacts, circuit means responsive to a predetermined degree of angular beam error connected to the coil, and circuit means for conducting a voltage proportional to the beam error signal to the contacts for applying the voltage to the control winding after a predetermined interval of time, thereby saturating the load winding and increasing gain of the beam error signal conducted to the load winding and thence to the computer.

5. The method of providing distance information from a ground Localizer or Visual Omni Range transmitter for an aircraft computer, comprising the steps of transmitting a radio beam from ground to an aircraft at an unknown distance from the transmitter, providing a voltage proportional to beam error, measuring the change in beam error voltage over a preset time interval beginning when the aircraft reaches a predetermined degree of angular beam error along its flight path, and comparing the measured change in beam error voltage with the change that would occur at a known distance from the transmitter along a parallel flight path to provide information as to distance of the aircraft from the transmitter.

6. The method of providing distance information from a ground Localizer or Visual Omni Range transmitter for an aircraft computer, comprising the steps of transmitting a radio beam from ground to an aircraft at an unknown distance from the transmitter, providing a voltage proportional to beam error, producing a control voltage at a predetermined degree of angular beam error, measuring the beam error signal at a preset interval of time after the control voltage is produced, and comparing the measured beam error signal with the beam error signal that would occur after the preset interval at a known distance from the transmitter along a parallel flight path to provide information as to distance of the aircraft from the transmitter.

7. A beam capture control device for providing distance information to a computer, comprising a saturable reactor having a load winding and a control winding, means producing a beam error signal connected to the load winding of the saturable reactor, a time delay relay having a coil and contacts, circuit means responsive to a predetermined degree of angular beam error connected to the coil for energizing the coil, and a synchronizer connected to the beam error signal producing means for producing an output voltage proportional to the beam error signal whereby upon expiration of a predetermined time interval after energization of the coil, synchronizer output voltage is applied through a contact of the time delay relay across the control winding of the saturable reactor, thereby increasing gain of the beam error signal conducted to the load winding and thence to the computer.

8. A beam capture control device for providing distance information to a computer, comprising a synchronizer, means producing a beam error signal connected to the synchronizer, a saturable reactor having a control winding and a load winding, an auto transformer connected in series with the load winding, means for applying the beam error signal across the series combination of load winding and auto transformer, means responsive to the beam error signal for detecting a beam error signal of predetermined value and time delay means connected to said beam error responsive means for applying synchronizer output across the control winding of the saturable reactor upon elapse of a predetermined interval of time starting after the beam error signal has reached the predetermined value.

9. The beam capture control device of claim 8 wherein the synchronizer includes a synchro for providing synchronizer output, and a motor for mechanically positioning the synchro rotor in response to the beam error signal.

10. The beam capture control device of claim 8 including a rectifier connected between the synchronizer and the control winding.

11. The beam capture control device of claim 8 including a full wave rectifier connected between the synchronizer and the control winding.

12. A beam capture control device for providing distance information to a computer, comprising a saturable reactor having a load winding and a control winding, an auto transformer connected in series with the load winding, means producing a beam error signal connected across the series combination of load winding and auto transformer, a time delay relay having a coil and contacts, circuit means responsive to a predetermined degree of angular beam error connected to the coil for actuating the coil, and means connected to the beam error signal producing means for producing an output voltage proportional to the beam error signal whereby upon expiration of a predetermined time interval after actuation of the coil the output voltage is applied through a contact of the time delay relay across the control winding of the saturable reactor thereby increasing gain of the beam error signal applied to the auto transformer and thence to the computer.

13. A beam capture control device for providing distance information to a computer, comprising a saturable reactor having a load winding and a control winding, an auto transformer connected in series with the load winding, means producing a beam error signal connected across the series combination of the load winding and auto transformer, a time delay relay having a coil and contacts, circuit means responsive to a predetermined degree of angular beam error connected to the coil for actuating the coil, and a synchronizer connected to the beam error signal producing means for producing an output voltage proportional to the beam error signal whereby upon expiration of a predetermined time interval after actuation of the coil the synchronizer output voltage is applied through a contact of the time delay relay across the control winding of the saturable reactor thereby increasing gain of the beam error signal applied to the auto transformer and thence to the computer.

14. The beam capture control device of claim 13 including a rectifier connected between the synchronizer and the control winding.

15. The beam capture control device of claim 13 including a full wave rectifier connected between the synchronizer and the control winding.

16. A beam capture control device for providing distance information to a computer, comprising switching means having a control circuit, means producing a beam error signal connected to the switching means, and means responsive to a predetermined degree of angular beam error and connected to the control circuit of the switching means for changing impedance of the switching means from a high to a low value after a predetermined interval of time, thereby changing beam error signal gain for application to the computer.

17. A beam capture control device for providing distance information to a computer, comprising a saturable reactor having a load winding and a control winding, an auto transformer connected in series with the load winding of the saturable reactor, means producing a beam error signal connected across the series combination of the load winding and auto transformer, and means responsive to a predetermined degree of angular beam error and connected to the control winding of the saturable reactor for changing impedance of the reactor from a high to a low value after a predetermined interval of time, thereby changing beam error signal gain for application to the computer from the auto transformer.

18. The beam capture control device of claim 17 wherein the means responsive to a predetermined degree of angular beam error includes a synchronizer.

19. The beam capture control device of claim 17 wherein the means responsive to a predetermined degree of angular beam error includes a rectifier.

20. A beam capture control device for providing distance information to a computer, comprising a variable impedance device, means producing a beam error signal connected to the variable impedance device, and means responsive to a predetermined degree of angular beam error and connected to the variable impedance device for changing impedance of the device after a predetermined interval of time in accordance with the beam error, thereby changing beam error signal gain for application to the computer.

No references cited.

CHESTER L. JUSTUS, *Primary Examiner.*